R. W. WORKMAN.
Plow.

No. 205,458.   Patented June 25, 1878.

WITNESSES:
W. W. Hollingsworth
Solon C. Kemon

INVENTOR:
R. W. Workman
BY
Munn & Co
ATTORNEYS.

UNITED STATES PATENT OFFICE.

REASE W. WORKMAN, OF ROCK HILL, SOUTH CAROLINA, ASSIGNOR OF ONE-HALF HIS RIGHT TO JOHN R. LOUDON, OF SAME PLACE.

IMPROVEMENT IN PLOWS.

Specification forming part of Letters Patent No. 205,458, dated June 25, 1878; application filed April 23, 1878.

*To all whom it may concern:*

Be it known that I, REASE W. WORKMAN, of Rock Hill, in the county of York and State of South Carolina, have invented a new and useful Improvement in Plows; and I do hereby declare that the following is a full, clear, and exact description of the same.

Plows have been provided with a colter consisting of a straight bar having a beveled edge, and placed in a diagonal position or inclining forward, and connecting the beam and standard, so as to serve as a brace for the latter.

Colters of this class have proved objectionable in use, owing to the tendency to clog, and to the fact that the lower end of the colter is so far back of the share as scarcely to assist in dividing the soil.

Plow-standards have likewise been made adjustable by pivoting them to the beam and securing the lower end to a curved bar or brace having perforations to receive a locking-pin.

The handles of plows have also been extended below the beam and attached to the standard.

My invention is an improvement upon these three classes of plows, whereby I combine certain features peculiar to each and secure advantages possessed by none of them.

The invention consists in the construction and arrangement of parts, hereinafter described and claimed.

Figure 1:
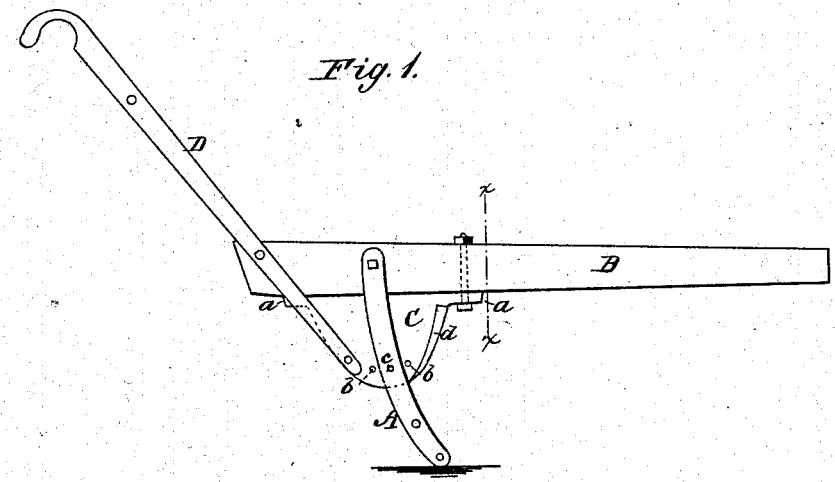
Figure 2:
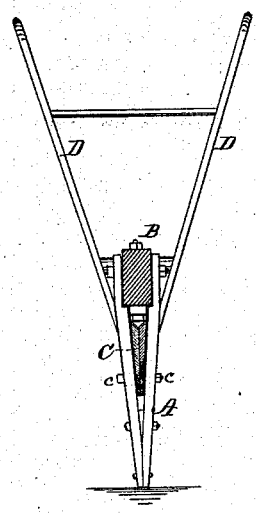

In the accompanying drawing, forming part of this specification, Figure 1 is a side elevation of my improved plow, and Fig. 2 is a cross-section on line $x\,x$, Fig. 1.

The foot or standard A is bifurcated, or composed of two bars of like length, width, and form, one of which is pivoted to the beam B, on each side thereof.

The fixed colter C is a plate having a semicircular edge and projecting arms $a$, through which latter pass the bolts that secure it to the beam B.

The standard A is pivoted at a point just in rear of a line drawn vertically through the middle of the colter-plate, and hence the latter lies between or separates the upper portions of the bars composing the standard.

The lower edge of the colter is perforated with holes $b$, which lie in the arc of a circle described from the pivot of standard A. The lower end of the latter is adjusted to vary the angle of the share to the line of draft, and thereby also the depth to which it will enter the soil, and the holes $e$ enable the standard to be secured in any adjustment by means of a detachable bolt, $c$, passing through it and the plate B, as shown.

The front side or edge $d$ of the colter is beveled sharply to adapt it to cut the soil raised by the share or plow proper, (not shown,) which will be in practice secured to the lower end of the standard A.

Thus the plate C combines the functions of a colter for the plow and a brace for the standard A.

The plow-handles D are bolted to the beam B, and are also extended downward and bolted to the colter-plate C.

By the above-described construction and arrangement of parts both the bars of the standard and the handles, being inclined at an angle to the colter-plate, serve as lateral braces therefor, while they are in turn braced or rendered more rigid by reason of such attachment to the colter.

The handles and standards also brace the colter in a lengthwise direction, and the edge of the colter projects downward and forward in front of the standard, so as to greatly assist in dividing the soil.

The form and rigidity of the colter enable it to easily sever vines, stubble, and comparatively large roots.

What I claim is—

The fixed colter and brace-plate C, having a convex or semicircular cutting-edge, $d$, in combination with the bifurcated standard A, adjustable upon the colter-plate, and the handles D, extended downward and bolted to said plate, all as shown and described, and for the purposes specified.

REASE W. WORKMAN.

Witnesses:
 W. M. FREW,
 FRED. H. LOUDON.